Nov. 2, 1937.  E. J. HARRIS  2,097,620
METHOD AND APPARATUS FOR FIRING CERAMIC WARE
Filed Feb. 15, 1935
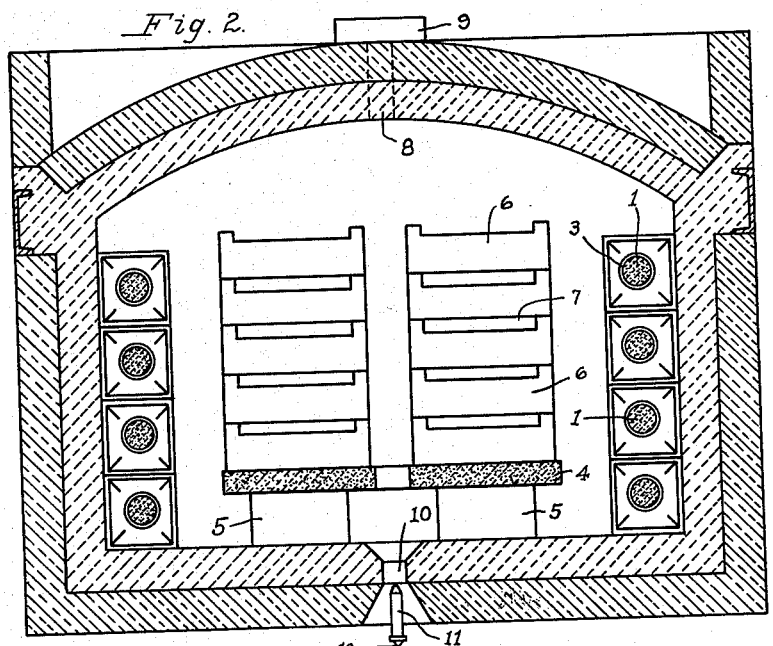
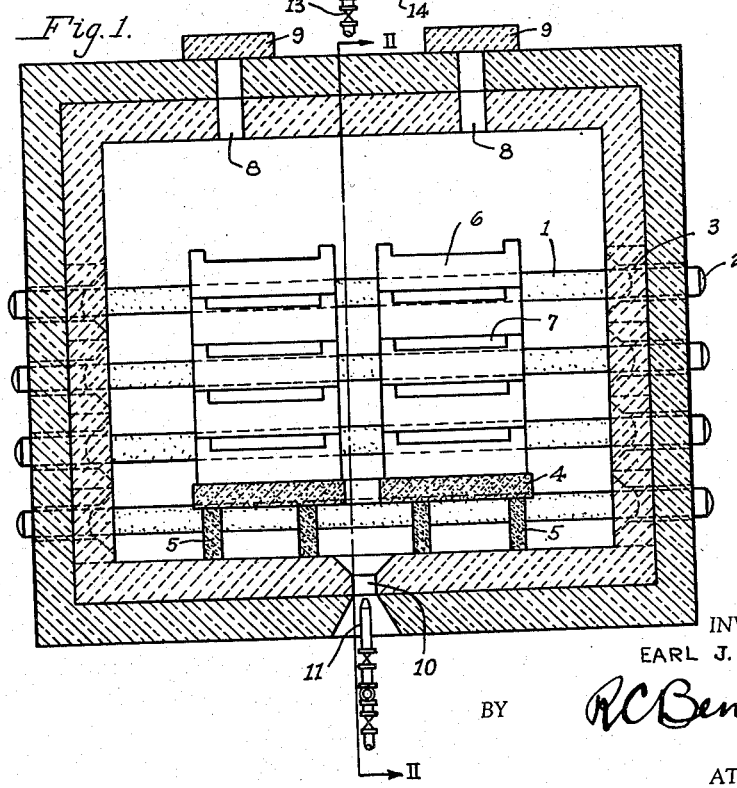
INVENTOR.
EARL J. HARRIS
BY RCBenner
ATTORNEY.

Patented Nov. 2, 1937

2,097,620

UNITED STATES PATENT OFFICE 2,097,620

METHOD AND APPARATUS FOR FIRING CERAMIC WARE

Earl J. Harris, Niagara Falls, N. Y., assignor, by mesne assignments, to The Carborundum Company, Niagara Falls, N. Y., a corporation of Delaware Application February 15, 1935, Serial No. 6,708

6 Claims. (Cl. 25—132)

This invention relates broadly to a new method of firing ceramic and other wares and to a new furnace especially therefor.

It has been customary in the past to fire ceramic ware in flame heated furnaces, burning gas, oil, coal or the like, to produce the requisite heat and allowing the more or less spent combustion gases to contact the ware and transfer heat directly to it. Subsequent to the development of radiating combustion chambers, efforts were made to utilize radiant heat for such burning. It was found however that satisfactory results were not in general attained unless the combustion gases were allowed to circulate among the ware being burned or special facilities such as tunnel-loops around the combustion chamber were provided to cause convection currents in the furnace, characteristic examples being the Dressler kilns shown in Patents Nos. 1,023,628 and 1,348,486.

More recently it has become apparent that in certain localities, low electric power rates and cheap local supplies of ceramic raw materials made electric firing of ceramic products highly desirable. In fact the cleanliness, speed and accuracy of control of electric furnaces is such as to commend them even where, on the basis of cost per B. t. u., other sources of heat appear more advantageous. Although the electric heating of metals has offered no great problem, due to the high thermal conductivity of the metal and the absence of any problem of combustion within the material being heated; the heating of ceramic wares by electrical means has not in general proved satisfactory due to the absence of adequate atmospheric circulation within the furnace and to the total dependence upon radiant heat. This condition has been so pronounced that within the year, the secretary of the American Ceramic Society has publicly denounced electric furnaces as unsuited for ceramic firing and nothing but "toasters".

It has indeed been true that when the ware was thin and was fired in a single layer with equal exposure of all parts to the radiation from the resistors, some electrically heated furnaces produced good ceramic ware. It proved impossible however to adapt this type of heating to heavier ware or build furnaces in which "pay loads" of anything but costly specialties could be handled. Numerous attempts were made to induce circulation by convection up around the hot resistors and down through the cooler central portion of the furnace. These were not however successful as such furnaces heated very unevenly and produced a high precentage of warped and unevenly burned ware. Motor driven, heat-resistant fans inserted within the furnace have also been suggested for producing circulation of the atmosphere. These are however costly, space consuming and short lived.

I have devised a furnace in which excellent results are secured with sizeable loads and at a very moderate cost. I have moreover discovered certain advantageous factors in connection with the operation of this furnace which are contrary to generally accepted firing principles. These will be discussed below after the furnace has been described.

Figure 1 shows a longitudinal vertical cross section through the center of a furnace made in accordance with my invention.

Figure 2 shows a cross section of the same furnace taken at section II—II of Figure 1.

The furnace illustrated utilizes silicon carbide resistor elements 1, although my invention is also applicable with metallic resistor wires. The connections 2 for these resistors pass through the furnace walls through suitable ports 3. The connections may be of the water cooled or other type, and outside the furnace connect with leads from the power supply and with retention springs (not shown) to hold them against the resistor. Such accessories are well known in the furnace art and require no further explanation here.

Within the furnace a hearth 4 is provided supported on piers 5 set at an angle with the resistors. On this hearth the material to be burned is loaded in saggers 6 or otherwise to form an open setting permitting gases to circulate about the ware and between the sagger walls as for example through the spaces 7. The top of the furnace is provided with a vent 8, closable by a firebrick seal 9, through which gaseous products resulting from the effect of heat on the ware may be allowed to escape during certain portions of the furnace run. Also in the floor of the furnace is an orifice 10 having located therein a pipe 11 for admission of a jet of air, steam or other gas to the furnace. This may be spaced somewhat as shown to secure an aspirator action or may be sealed as completely as may be desired so that only the gas so injected is admitted at this point.

In the particular form illustrated the pipe 11 is intended to admit steam, so that it is provided with valves 12, 13 and 14. In operation valve 12 is closed, 13 is opened and 14 then opened until the liquid water is blown out of the system, after which 13 is closed and 12 opened. The steam jet thus admitted should not be violent and need be only a surprisingly small amount to produce the necessary atmospheric "drift" within the furnace. The steam escapes from the furnace through ports 3 and elsewhere but should not in general flow through these with a velocity perceptible to the casual observer. While it is possible to utilize a jet of air or other gas in like manner I have found it somewhat better to use steam where moderately oxidizing conditions are desired. The steam is an active oxidant and is hotter than ordinary compressed air, so detracts less from the furnace temperature.

Reference was made above to certain peculiar factors of operation. The first is that the jet tends to cause convection in the opposite direction from that which would be normally induced by the resistors themselves. This is not strictly essential, but appears advantageous, I believe because it introduces a greater degree of lateral circulation throughout the whole furnace than results from purely convectional circulation. It has also a further specific advantage in the case of the use of a steam jet with silicon carbide resistors in that this gas has too oxidizing an effect on the silicon carbide when admitted directly against the resistor, although it appears to have no detrimental action when admitted as here shown.

The second unexpected factor is that it has been found necessary to use the jet to secure circulation for only a small proportion of the total time of the run. It had been assumed that constant circulation would be required. I find on the contrary that with a load of light ware, jet action for a period of only 30 minutes to one hour is ample provided it includes that portion of the heating period after water-smoking is complete and approximately at or just below the point at which vitrification sets in. For example on a burn made at 1300° C., it suffices to start the jet when the loaded furnace reaches 1200° C., adjusting it so as to maintain the temperature at 1200° C. and allowing it to continue for one half to one hour. The jet is thereafter shut off and the temperature brought up to 1300° C. and held for two hours. This action has proved sufficient to overcome trouble with dark centered and unevenly burned ware, and obviously requires far less power to complete the burn than where the jet is allowed to operate continuously throughout the entire run.

Another factor making the use of steam rather than air highly desirable is that I find that with steam the ultimate burning temperature required is frequently materially lowered, burns at 1250° C. being as effective with steam as those at 1300° C. without it in the case of certain ceramic bodies.

It should be understood that while the example above cited has proved very advantageous, it is given as an example only and my invention in its broad aspects is not limited by the particular design, substances, time or temperatures here recited.

I claim:

1. In an electrically heated furnace, a silicon carbide heating resistor and a gaseous jet for causing circulation of the gases within the furnace, the jet being so positioned as to tend to cause circulation in a direction opposite to that normally caused by convection.

2. The process of burning ceramic ware which comprises heating it in an electrically heated furnace while the atmosphere within the furnace is circulated by steam impulsion.

3. The process of burning ceramic ware in an electrically heated furnace which comprises heating it past the water-smoking stage and thereafter introducing steam into its ambient atmosphere for a fractional portion of the burning period.

4. The process of burning ceramic ware which comprises heating it in an electric resistance furnace and introducing water vapor into said furnace shortly before vitrification is effected.

5. The method of creating atmospheric circulation in an electrically heated furnace which comprises injecting a gaseous jet into the furnace in such manner as to tend to cause circulation in a direction different from the normal convectional circulation within the furnace.

6. In an electrically heated furnace, an electric resistor along an outer wall thereof, space within the furnace for loading ware to be burned, and a gaseous impulsion jet for causing circulation of the atmosphere within the furnace, said jet being on the opposite side of the loading space from said resistor and so directed as not to impinge directly upon said resistor.

EARL J. HARRIS.